United States Patent
Ringwall

[15] 3,695,283
[45] Oct. 3, 1972

[54] FLUIDIC OSCILLATOR

[72] Inventor: Carl G. Ringwall, Scotia, N.Y.
[73] Assignee: General Electric Company
[22] Filed: Dec. 2, 1970
[21] Appl. No.: 94,266

Related U.S. Application Data

[63] Continuation-in-part of Ser. No. 804,924, March 6, 1969, abandoned.

[52] U.S. Cl. .................................. 137/81.5, 137/83
[51] Int. Cl. .................................................. F15c 3/12
[58] Field of Search .......... 137/81.5, 82, 83; 235/201

[56] References Cited

UNITED STATES PATENTS

| | | | |
|---|---|---|---|
| 3,540,290 | 11/1970 | Shinn et al. | 137/81.5 X |
| 3,124,999 | 3/1964 | Woodward | 137/83 X |
| 3,275,015 | 9/1966 | Meier | 137/81.5 |

Primary Examiner—William R. Cline
Attorney—Derek P. Lawrence, Thomas J. Bird, Jr., Lee H. Sachs, Frank L. Neuhauser, Oscar B. Waddell and Joseph B. Forman

[57] ABSTRACT

A fluidic oscillator is disclosed which incorporates a flexurally mounted jet pipe adapted to oscillate and discharge alternately into a pair of receivers. The jet pipe includes a pair of opposed reaction surfaces radially displaced from its rotational axis and aligned with a pair of driving ports. Output from the jet pipe receivers is amplified by a proportional fluid amplifier, and a negative feedback is provided whereby fluid output from the proportional amplifier is directed to the driving ports and issued therefrom as a pulsating jet stream to promote oscillation of the jet pipe. In an alternative embodiment, the proportional fluid amplifier is replaced by a digital fluid amplifier.

7 Claims, 4 Drawing Figures

PATENTED OCT 3 1972 3,695,283
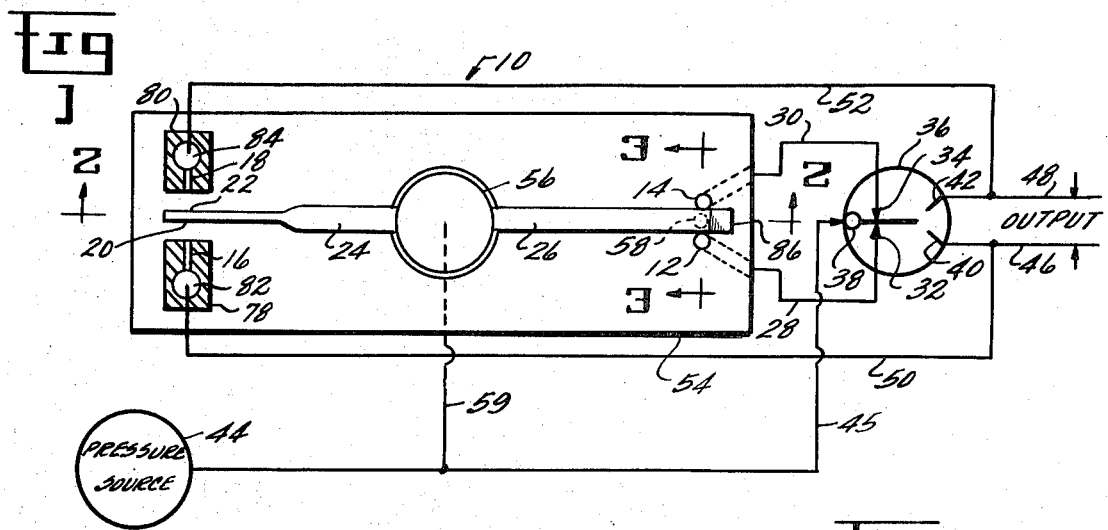
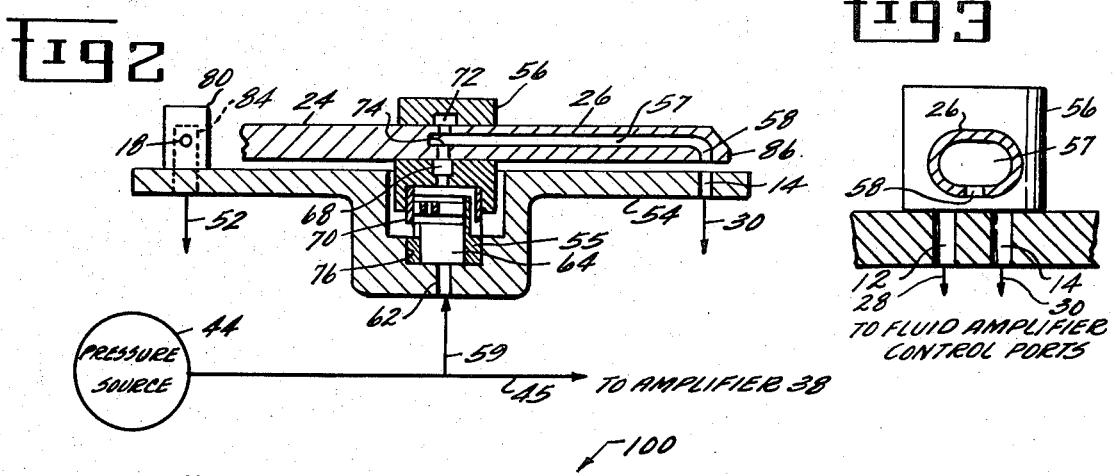
INVENTOR.
CARL G. RINGWALL
T. A. Bird, Jr.
AGENT-

FLUIDIC OSCILLATOR

This is a continuation-in-part of application Ser. No. 804,924, filed Mar. 6, 1969 now abandoned, entitled "Fluidic Oscillator," and assigned to the same assignee as the present invention.

BACKGROUND OF THE INVENTION

This invention relates to fluidic components and more particularly to a fluid oscillator capable of operating at a predetermined frequency with minimal sensitivity to supply pressure, temperature and vibration. The invention herein described was made in the course of or under a contract, or a subcontract thereunder, with the United States Department of the Army.

Many fluidic circuits utilize an oscillator for generating a fixed frequency reference against which a frequency generated elsewhere in the circuit can be either directly or indirectly compared. For example, a prime mover such as a jet engine or turboshaft engine will have a shaft speed limit beyond which sustained operation would be detrimental to the engine, and it becomes necessary to provide a governor system which will minimize overspeed operation. One such governor system comprises a fluidic circuit which directly or indirectly compares a frequency signal proportional to shaft speed with a fluidic frequency signal representative of the upper shaft speed limit, thus requiring a reference frequency oscillator adaptable to the aircraft engine environment. The environment experienced by control components on an aircraft engine requires that fluidic components including the oscillator be relatively insensitive to changes in fluid supply pressure, temperature, and vibration as well as to small contaminants in the fluid supply so that the weight and reliability penalties associated with devices such as pressure regulators and fluid filters can be minimized.

The prior art shows several oscillators adapted to provide a frequency output which is relatively constant such as, for example, those shown in U.S. Pat. No. 3,275,015, J. H. Meier, Sept. 27, 1966, and U.S. Pat. No. 3,333,596, S. Bottone, Jr., August 1967. Devices of this type are, however, subject to one or more of the effects described. For example, devices which use a vibrating reed or one leg of a tuning fork as a flapper to alternately open and close small bleed ports and thus vary the back pressure in a fluid line are contamination sensitive, supply pressure sensitive, and shock and vibration sensitive. Contamination sensitivity results from the small limit on port size, supply pressure sensitivity results from the force which fluid issuing from a bleed port exerts on the vibrating flapper, this force being dependent upon the pressure of fluid supplied to the device, and shock and vibration sensitivity is due to the displacement between the center of gravity and the center of support.

OBJECTS OF THE INVENTION

It is an object of this invention therefore to provide a constant frequency fluidic oscillator which is independent of fluid supply pressure and relatively contamination, shock and vibration insensitive.

BRIEF DESCRIPTION OF THE INVENTION

Briefly stated, the invention comprises a jet pipe flexurally mounted to a base member for rotational oscillation with respect thereto; the jet pipe is balanced to make its center of mass coincident with the center of rotation; the jet pipe including a jet nozzle for converting pressurized fluid to a fluid jet stream and a pair of opposed reaction surfaces radially spaced from the rotational axis; the base member containing a pair of receivers adapted to receive in varying proportions the jet stream issued from the jet nozzle and provide, either directly or indirectly, an output signal; and negative feedback means for providing fluid flow from each of the output means to a driving port aligned with a said reaction surface and located adjacent thereto, whereby each half cycle of oscillation of the jet pipe will result in fluid being recovered in a said receiver, provided to the output means and fed back to a driving port so as to reinforce the natural oscillation of the jet pipe toward the opposite said receiver.

DESCRIPTION OF THE DRAWING

While the specification concludes with claims particularly pointing out and distinctly claiming the invention, it will be better understood by reference to the discussion below and the accompanying drawing in which:

FIG. 1 is a partially schematic, partially plan view of a fluidic oscillator in accordance with this invention;

FIG. 2 is a section view taken along the line 2—2 of FIG. 1;

FIG. 3 is a fragmented section view taken along the line 3—3 of FIG. 1; and

FIG. 4 is a partially schematic, partially plan view of an alternative embodiment of the fluidic oscillator shown in FIG. 1.

DESCRIPTION OF THE PREFERRED EMBODIMENTS

FIG. 1 illustrates a preferred form of the invention comprising a jet pipe device 10 which includes jet receivers 12 and 14, a pair of oppositely disposed driving ports 16, 18, and a pair of reaction surfaces 20, 22 located on an extension 24 of jet pipe 26 and disposed between driving ports 20, 22. Jet receivers 12, 14 are connected respectively through conduits or passageways (the two terms are used interchangeably herein) 28, 30 to the control ports 32, 34 to fluid amplifier 36. Fluid amplifier 36 is a proportional amplifier of the well known type having a power nozzle (shown schematically at 38), a pair of receivers 40, 42 located downstream of the power nozzle 38 and oppositely disposed with respect to the axis thereof, and the control ports 32, 34 located on opposite sides of the axis of power nozzle 38 on a line intersecting therewith at a point between nozzle 38 and receivers 40, 42. Thus, a relatively high velocity fluid stream issuing from nozzle 38 (which is supplied from source 44 via conduit 45) can be deflected by relatively small fluid streams issuing through control ports 32, 34 and directed toward one or both of receivers 40, 42 in varying proportion to provide an output signal between conduits or passageways 46, 48. A portion of the fluid flow which enters receivers 40, 42 is fed back to driving ports 16, 18 respectively from output conduits 46, 48 via conduits 50, 52 and directed to ports 16, 18 to impinge upon reaction surfaces 20, 22 respectively and promote oscillation of jet pipe 26.

Referring now to FIGS. 1 – 3, jet pipe device 10 comprises a base member 54, a collar 56 flexurally mounted to base member 54 by a torsional spring device 55 such as that manufactured by Bendix Corporation generally referred to as a flexible pivot, and a member secured in collar 56 at right angles to the axis of rotation thereof, the member including extension 24 and jet pipe 26. Jet pipe 26 includes an internal passageway 57 which has its one terminus at a point near the axis of rotation of collar 56 and terminates at its other end with jet nozzle 58, which is located in the same plane as receivers 12, 14. Means for supplying fluid to passageway 57 include a conduit 59 branching from conduit 45 to a passage 62 in base member 54, a passage 64 extending through the torsional spring device 55 to the interior of collar 56, a short passage 68 extending from the cavity 70 in which torsional spring device 55 is secured to an annulus 72 surrounding jet pipe 26, and a pair of radial holes 74 extending through the wall of jet pipe 26 to the interior thereof.

In addition to receivers 12, 14, and passageway 62 which are drilled or otherwise formed in base member 54, base member 54 includes a cavity 76 in which the lower end of torsional spring device 55 is secured and a pair of standards 78, 80 which extend upwardly to a point which is at approximately the top of extension 24 and include the driving ports 16, 18. Standards 78, 80 also include suitable passageway means 82, 84 which are respectively connected with conduits 50, 52.

Operation of the oscillator can be described as follows. When no pressurized fluid is being supplied to the interior of jet pipe 26 from pressure source 44, jet pipe 26 will be oriented with respect to receivers 12, 14 so as to favor discharge of its jet stream from nozzle 58 into one or the other of receivers 12, 14. This state of the device will result from manufacturing tolerances providing a build-in bias to one or the other of receivers 12, 14. As soon as pressurized fluid is supplied to the interior of jet pipe 26, a fluid stream will issue from jet nozzle 58 and be divided between receivers 12, 14 in a proportion which is dependent upon the actual static position of jet pipe 26. One or the other of receivers 12, 14 will receive a greater proportion of the fluid which will cause a pressure and flow differential between control ports 32, 34 of fluid amplifier 36. This differential pressures will cause the simultaneously initiated power stream issuing from power nozzle 38 to be deflected toward one or the other of receivers 40, 42 in a proportion dependent upon the said pressure differential and provide an output signal which appears as a pressure or flow differential between conduits 46, 48. Part of the fluid flow appearing in conduit 46 will be returned through conduit or passageway 50 and passageway 82 to driving port 16, and part of the flow appearing in output conduit or passageway 48 will be similarly returned through conduit 52 and passageway 84 to driving port 18. Fluid streams will issue from each of ports 16, 18 the relative momentum of the two fluid streams being dependent upon the relative quantity of fluid being discharged into conduits 46, 48. Thus, collar 56 will be subjected to a torque generated by the fluid streams from ports 16, 18 impinging upon reaction surfaces 20, 22, respectively and, because of physical coupling between reaction surfaces 20, 22 and jet pipe 26, it will be urged from its initial position to a position in which the opposite of receivers 12, 14 will predominate over that which was favored initially. This will cause the direction of the differential output of receivers 12, 14 to reverse and consequently cause a reversal of the output signal between conduits 46, 48, whereupon the feedback effect just described will take place in reverse to that initially described and move the jet pipe back to a position approximating its initial position. The cycle described will then repeat itself indefinitely to excite jet pipe 26 into an oscillation at the system natural frequency, which, if the fluidic components and fluid lines are designed to have negligible capacitive and inductive reactance, will be at the natural frequency of the spring mass system comprising the torsional spring 55, collar 56, jet pipe 26, and extension 24.

Referring now to FIG. 4, an alternative form of the oscillator 10 of FIG. 1 is shown and generally labeled with the numeral 100. The oscillator 100 is identical to the oscillator 10 with the exception that the proportional amplifier 36 is replaced with a digital fluid amplifier 102. The digital fluid amplifier 102 is of the well known type having a power nozzle (shown schematically at 104), a pair of receivers 106, 108 located downstream of the power nozzle 104 and oppositely disposed with respect to the axis thereof and control ports 110, 112 located on opposite sides of the axis of the power nozzle 104. The control ports 110, 112 are located on a line intersecting the axis of the power nozzle 104 at a point between the nozzle 104 and the receivers 106, 108. Thus, a relatively high velocity fluid stream issuing from the nozzle 104 (which is supplied from the source 44 via the conduit 45), can be deflected by relatively small fluid streams issuing through the control ports 110, 112. In contrast to the proportional amplifier 36 which provides a signal at the receivers 40, 42 in varying proportions to the pressure of the fluid at the control ports 32 and 34 (and thus provides an output signal between conduits 46 and 48 which varies in proportion to the input pressures), the digital amplifier 102 provides an output at either receiver 106 or 108 in response to an input at the control ports 112 and 110, respectively. In other words, the output signal between conduits 46 and 48 becomes a square wave output as opposed to a sine wave (or some similar function).

Operation of the oscillator 100 is also very similar to that of the oscillator 10. Once again, manufacturing tolerances provide a built-in bias to one or the other of receivers 12, 14 from the jet pipe 26. As soon as pressurized fluid is supplied to the interior of the jet pipe 26, a fluid stream will issue from the jet nozzle 58 and will be divided between receivers 12 and 14 in a proportion which is dependent upon the actual static position of the jet pipe 26. One or the other of the receivers 12, 14 will receive a greater proportion of the fluid which will cause a pressure and flow differential between the control ports 110, 112 of the fluid amplifier 102. This differential pressure will cause the simultaneously initiated power stream issuing from the power nozzle 104 to be deflected toward one or the other of the receivers 106, 108. This results in an output signal which appears as a pressure or flow differential between conduits 46, 48.

As was the case in the operation of the oscillator 10, part of the fluid flow appearing in conduit 46 will be returned through the conduit or passageway 50 and the passageway 82 to the driving port 16; and part of the flow appearing in output conduit or passageway 48 will be similarly returned through the conduit 52 and the passageway 84 to the driving port 18. Fluid streams will issue from each of the ports 16 and 18 with the relative momentum of the two fluid streams being dependent upon the relative quantity of the fluid being discharged into the conduit 46 and 48.

Thus, the collar 56 will be subjected to a torque generated by the fluid streams from the ports 16 and 18 impinging upon the reaction surfaces 20 and 22, respectively, and because of the physical coupling between the reaction surfaces 20 and 22 and the jet pipe 26, the jet pipe 26 will be urged from its initial position to a position in which the opposite of the receivers 12, 14 will predominate over that which was favored initially. This will cause the direction of the differential output of receivers 12 and 14 to reverse, and consequently, cause a reversal of the output signal between conduits 46 and 48. The feedback effect previously described will then take place in reverse and will move the jet pipe 26 back to a position approximating its initial position. The cycle described will then repeat itself indefinitely to excite the jet pipe 26 into an oscillation at the system natural frequency.

Operation of the oscillator as described will be relatively insensitive to contamination appearing in the fluid supplied from source 60 inasmuch as jet nozzle 58 and receivers 12, 14 can be constructed to have a size sufficient to permit passage of most commonly encountered contaminants. Further, inasmuch as all interaction between the jet stream issuing from nozzle 58 and the receivers 12, 14 will have force components parallel to the oscillating plane (i.e., that defined by the longitudinal axis of jet pipe 26 and the axis of rotation of collar 56), there will be no torque coupling between the jet pipe 26 and receivers 12, 14 tending to damp the oscillation. In this connection, it should also be noted that if receivers 12, 14 were located adjacent the end 86 of jet pipe 26 in the plane of oscillation (i.e., that plane normal to the axis of rotation of collar 56) and jet nozzle 58 extended longitudinally through the end 86 of jet pipe 26, any interaction between nozzle 58 and receivers 12, 14 would similarly be void of a damping effect upon the oscillation of jet pipe 26. This absence of damping or torque coupling between the active oscillating member and its output means operates to render the oscillator almost entirely independent of the pressure supplied from source 60. This is in contrast to the result obtained with the prior art devices incorporating a vibrating reed flapper or other similar device which alternately varies the area of bleed orifices from a pair of conduits containing pressurized fluid so as to superimpose a cyclic pressure variation on a steady or d.c. signal. In these latter mentioned devices, the interaction between the d.c. signal and the oscillating member results in forces which tend to dampen the oscillation, the magnitude of the damping effect being dependent upon the d.c. level, which is in turn dependent upon the supply pressure of the active fluid.

Having thus described the invention, what is desired to be secured by Letters Patent is claimed below.

I claim:

1. A constant frequency fluidic oscillator which comprises
   A. a jet pipe device comprising,
      a base member
      a jet pipe flexurally mounted to said base member for rotational oscillation with respect thereto, said jet pipe including means for supplying pressurized fluid to the interior thereof, a jet nozzle for converting the pressurized fluid to a fluid jet stream; and a pair of opposed reaction surfaces radially spaced from the rotational axis thereof,
      a pair of jet receivers formed in said base member and located therein to be impinged upon by the said fluid jet stream, said receivers being located on opposite sides of the longitudinal axis of said jet pipe when said jet pipe is at a mid-point of its oscillation, said jet pipe being positioned so as to favor discharge of its jet stream into one of said pair of jet receivers when neither of the opposed reaction surfaces is being acted upon,
      a pair of driving ports, each disposed adjacent one of said reaction surfaces and spaced therefrom a distance sufficient to permit motion of said reaction surfaces between said driving ports; and
      means for supplying pressurized fluid to said jet pipe;
   B. output means for obtaining an output signal from said receivers;
   C. negative feedback means for directing the output signal from a first said jet receiver to the one of said driving ports which is coupled through a reaction surface on said jet pipe to urge said jet pipe nozzle to a position in which the second said receiver will be impinged by said jet stream; and
   D. negative feedback means for directing the output signal from the second said jet receiver to the opposite of said one driving port.

2. The fluidic oscillator recited in claim 1 wherein
   A. said output means includes a proportional fluid amplifier having a power nozzle for converting pressurized fluid to a fluid power stream, a pair of output receivers located downstream of said power nozzle and oppositely disposed with respect to the axis thereof, and a pair of control ports oppositely disposed with respect to the axis of said power nozzle on a line intersecting therewith at a point between said power nozzle and said receivers,
      passageway means connecting the first said jet receiver with one of said control ports, and
      passageway means connecting the second said jet receiver with the other of said control ports; and
   B. said negative feedback means comprises said fluid amplifier, and
      passageway means connecting a first said output receiver to the one of said driving ports which is coupled through a reaction surface on said jet pipe to urge said jet pipe to a position which will cause the signal from said output means to predominate in the second said output receiver, and
      passageway means for connecting the second said output receiver to the opposite of said one driving port.

3. The fluidic oscillator recited in claim 2 wherein said jet pipe comprises a collar flexurally mounted to said base member and having an axis of rotation with respect thereto;
- a hollow pipe extending from said axis of rotation in a direction normal thereto; and
- a solid member extending in a direction opposite the said one direction and including at its end the said reaction surfaces.

4. The fluidic oscillator recited in claim 3 wherein the axis of said jet nozzle is parallel to said axis of rotation.

5. The fluidic oscillator recited in claim 1 wherein
A. said output means includes a digital fluid amplifier having a power nozzle for converting pressurized fluid to a fluid power stream, a pair of output receivers located downstream of said power nozzle and oppositely disposed with respect to the axis thereof, and a pair of control ports oppositely disposed with respect to the axis of said power nozzle on a line intersecting therewith at a point between said power nozzle and said receivers,
passageway means connecting the first said jet receiver with one of said control ports, and
passageway means connecting the second said jet receiver with the other of said control ports; and B. said negative feedback means comprises said fluid amplifier, and
passageway means connecting a first said output receiver to the one of said driving ports which is coupled through a reaction surface on said jet pipe to urge said jet pipe to a position which will cause the signal from said output means to predominate in the second said output receiver, and
passageway means for connecting the second said output receiver to the opposite of said one driving port.

6. The fluidic oscillator recited in claim 5 wherein said jet pipe comprises a collar flexurally mounted to said base member and having an axis of rotation with respect thereto;
- a hollow pipe extending from said axis of rotation in a direction normal thereto; and
- a solid member extending in a direction opposite the said one direction and including at its end the said reaction surfaces.

7. The fluidic oscillator recited in claim 6 wherein the axis of said jet nozzle is parallel to said axis of rotation.

* * * * *